(12) United States Patent
Hokuto

(10) Patent No.: US 9,599,037 B2
(45) Date of Patent: Mar. 21, 2017

(54) CONTROL APPARATUS OF INTERNAL COMBUSTION ENGINE

(71) Applicant: Hiroyuki Hokuto, Numazu (JP)

(72) Inventor: Hiroyuki Hokuto, Numazu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/782,828

(22) PCT Filed: Apr. 9, 2013

(86) PCT No.: PCT/JP2013/060724
§ 371 (c)(1),
(2) Date: Oct. 7, 2015

(87) PCT Pub. No.: WO2014/167649
PCT Pub. Date: Oct. 16, 2014

(65) Prior Publication Data
US 2016/0053693 A1 Feb. 25, 2016

(51) Int. Cl.
*F01N 3/00* (2006.01)
*F02D 13/02* (2006.01)
(Continued)

(52) U.S. Cl.
CPC ......... *F02D 13/0261* (2013.01); *F01N 3/106* (2013.01); *F01N 3/20* (2013.01);
(Continued)

(58) Field of Classification Search
USPC ............... 60/274, 280, 284, 285, 286, 303; 123/90.15, 90.16
See application file for complete search history.

(56) References Cited

U.S. PATENT DOCUMENTS

| 6,276,334 B1* | 8/2001 | Flynn | ...................... F02B 19/14 |
| | | | 123/435 |
| 7,178,327 B2* | 2/2007 | Miyashita | ........... F02D 41/0007 |
| | | | 60/274 |

(Continued)

FOREIGN PATENT DOCUMENTS

| JP | 2006-177189 A | 7/2006 |
| JP | 2010-112296 A | 5/2010 |

(Continued)

*Primary Examiner* — Binh Q Tran
(74) *Attorney, Agent, or Firm* — Andrews Kurth Kenyon LLP

(57) ABSTRACT

A control apparatus of an internal combustion engine which is capable of a lean burn operation and which includes a catalyst which is provided in an exhaust passage of the internal combustion engine and which has an oxidizing ability, a supercharger; an in-passage injection valve which injects fuel into an intake passage; an in-cylinder injection valve which injects fuel into a cylinder, and a variable valve apparatus which changes at least one of an opening timing of an intake valve and a closing timing of an exhaust valve. The control apparatus performs creating a valve overlap that is a state where the intake valve and the exhaust valve of the internal combustion engine are opened, completing an injection of fuel from the in-passage injection valve during a period in which the intake valve is closed, and completing an injection of fuel from the in-cylinder injection valve during an intake stroke when intake air pressure of the internal combustion engine is higher than atmospheric pressure.

10 Claims, 7 Drawing Sheets

(51) Int. Cl.
  *F01N 3/20* (2006.01)
  *F01N 3/36* (2006.01)
  *F02D 41/02* (2006.01)
  *F02D 41/30* (2006.01)
  *F02D 41/00* (2006.01)
  *F01N 3/10* (2006.01)
  *F02B 33/34* (2006.01)
  *F02D 41/04* (2006.01)

(52) U.S. Cl.
  CPC ............ *F01N 3/2066* (2013.01); *F01N 3/36* (2013.01); *F02B 33/34* (2013.01); *F02D 41/0007* (2013.01); *F02D 41/024* (2013.01); *F02D 41/04* (2013.01); *F02D 41/3094* (2013.01); *F02D 2041/001* (2013.01); *F02D 2200/703* (2013.01); *Y02T 10/144* (2013.01); *Y02T 10/18* (2013.01); *Y02T 10/26* (2013.01)

(56) References Cited

U.S. PATENT DOCUMENTS

| | | | |
|---|---|---|---|
| 7,467,617 B2 * | 12/2008 | Irisawa | F02D 41/008 123/295 |
| 7,707,988 B2 * | 5/2010 | Irisawa | F02D 13/0226 123/299 |
| 8,352,153 B2 * | 1/2013 | Gibson | F02D 13/0261 123/179.4 |
| 8,960,133 B2 * | 2/2015 | Leone | F02B 47/08 123/1 A |
| 2005/0097888 A1 | 5/2005 | Miyashita | |
| 2006/0130463 A1 | 6/2006 | Miura | |
| 2007/0119420 A1 | 5/2007 | Leone et al. | |

FOREIGN PATENT DOCUMENTS

| | | |
|---|---|---|
| JP | 2011-190771 A | 9/2011 |
| JP | 2012-107588 A | 6/2012 |

* cited by examiner

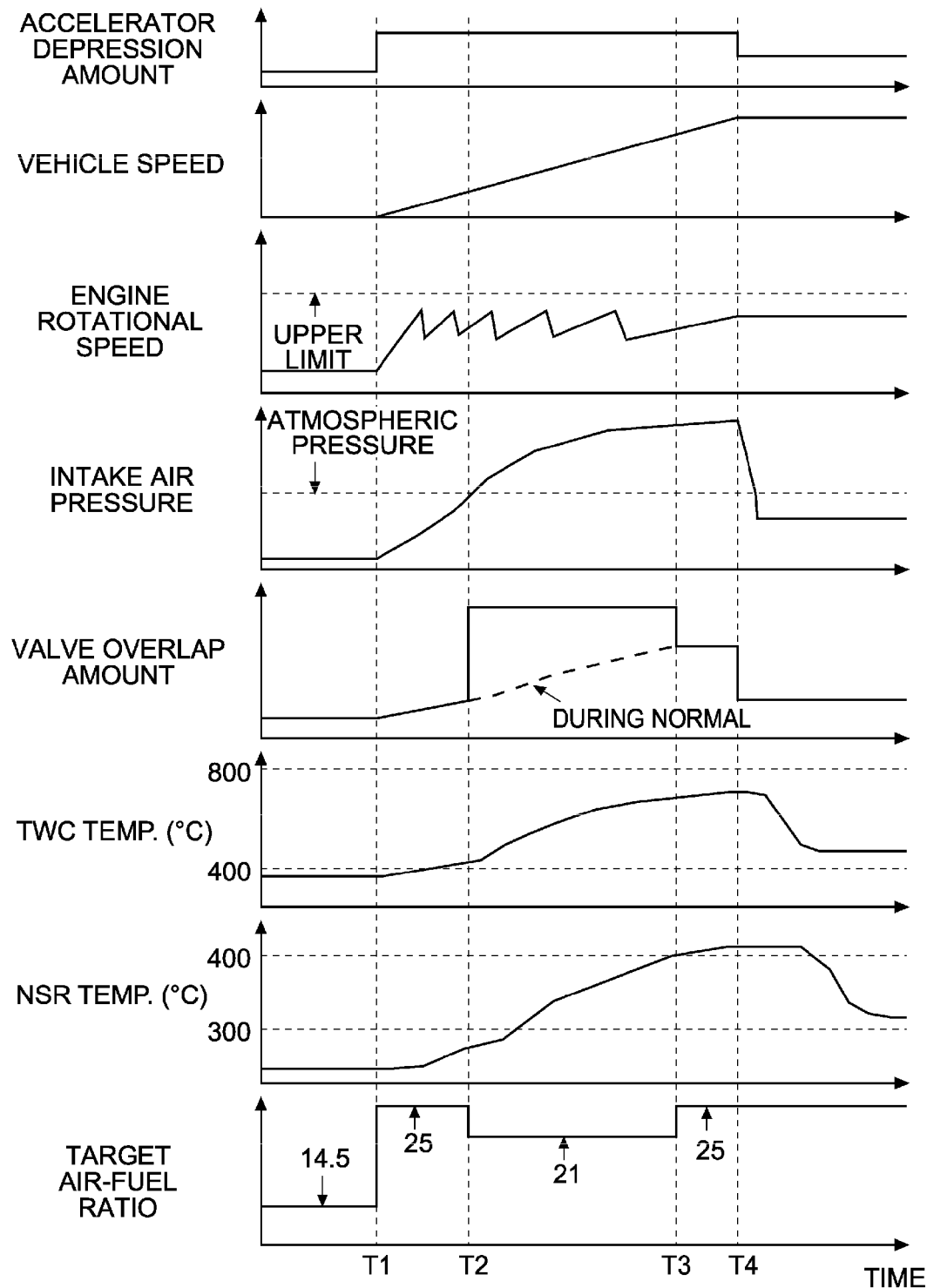

CONTROL APPARATUS OF INTERNAL COMBUSTION ENGINE

CROSS-REFERENCE TO RELATED APPLICATION

This is a national phase application based on the PCT International Patent Application No. PCT/JP2013/060724 filed Apr. 9, 2013, the entire content of which is incorporated herein by reference.

TECHNICAL FIELD

The present invention relates to a control apparatus of an internal combustion engine.

BACKGROUND ART

There is known a technique in which, in an internal combustion engine which includes a supercharger and which directly injects fuel into a cylinder, causes a valve overlap during supercharging in order to raise temperature of a catalyst and performs stratified combustion while retarding an injection timing of the fuel (for example, refer to Patent Document 1).

In addition, a technique is known which, when a first fuel injection value that injects fuel into a combustion chamber and a second fuel injection value that injects fuel into an intake passage of an internal combustion engine are provided, performs a first temperature raising mode for performing fuel injection by setting an injection timing of the first fuel injection value to a compression stroke and setting an injection timing of the second fuel injection value to an exhaust stroke and a second temperature raising mode for setting the injection timing of the first fuel injection value to the compression stroke and setting the injection timing of the second fuel injection value to an intake stroke for some cylinders and to the exhaust stroke for other cylinders after the first temperature raising mode (for example, refer to Patent Document 2).

Furthermore, a technique is known which, in an internal combustion engine including a supercharger, improves acceleration performance by increasing a valve overlap amount during an accelerating operation to cause intake air to forcibly flow into an exhaust passage, and when subsequently making a transition to a steady operation, reduces a valve overlap while prohibiting a wastegate valve from being driven toward an open-valve side until the valve overlap amount converges to a target value (for example, refer to Patent Document 3).

Moreover, a technique is known for performing fuel injection by a fuel injection valve during a period in which there is a valve overlap, causing a part of the injected fuel to forcibly flow from an intake port to an exhaust port and, accordingly, causing combustion of the forcibly flowed fuel by secondary air while suppressing an air-fuel ratio in a cylinder to a level where misfire does not occur in order to raise exhaust temperature (for example, refer to Patent Document 4).

With an internal combustion engine that performs a lean burn operation, since allowing an overlap to occur causes low-temperature intake air to flow through an exhaust passage, there is a possibility that temperature of a catalyst may drop or a temperature rise of the catalyst may slow down.

PRIOR ART REFERENCES

Patent Documents

Patent Document 1: Japanese Patent Application Laid-open No. 2010-112296
Patent Document 2: Japanese Patent Application Laid-open No. 2012-107588
Patent Document 3: Japanese Patent Application Laid-open No. 2011-190771
Patent Document 4: Japanese Patent Application Laid-open No. 2006-177189

SUMMARY OF THE INVENTION

Problems to be Solved by the Invention

The present invention has been made in consideration of the problem described above and an object thereof is to promote temperature rise of a catalyst.

Means for Solving the Problems

In order to achieve the object described above, a control apparatus according to the present invention is an apparatus of an internal combustion engine that is capable of a lean burn operation and includes:
a catalyst which is provided in an exhaust passage of the internal combustion engine and which has an oxidizing ability;
a supercharger;
an in-passage injection valve which injects fuel into an intake passage of the internal combustion engine;
an in-cylinder injection valve which injects fuel into a cylinder of the internal combustion engine; and
a variable valve apparatus which changes at least one of an opening timing of an intake valve and a closing timing of an exhaust valve of the internal combustion engine, and
the control apparatus performs creating a valve overlap that is a state where the intake valve and the exhaust valve of the internal combustion engine are opened, completing an injection of fuel from the in-passage injection valve during a period in which the intake valve is closed, and completing an injection of fuel from the in-cylinder injection valve during an intake stroke when intake air pressure of the internal combustion engine is higher than atmospheric pressure.

During a lean burn operation, since temperature of exhaust gas drops, temperature of the catalyst may drop. In contrast, the temperature of the catalyst may be raised by supplying fuel to the catalyst. By completing fuel injection from the in-passage injection valve during a period in which the intake valve is closed, an air-fuel mixture can be retained in the intake passage before the intake valve opens. In addition, at a time point when the intake valve is opened, since the exhaust valve is also opened and a supercharged state exists, the air-fuel mixture passes through the cylinder from the intake passage toward the exhaust passage. Oxygen and fuel that flow out to the exhaust passage in this manner are reacted by the catalyst having an oxidizing ability and generates heat. Accordingly, the temperature of the catalyst can be raised. In addition, since the fuel injection from the in-cylinder injection valve is completed during an intake stroke in which a piston moves from an exhaust top dead center to an intake bottom dead center, the fuel injected from the in-cylinder injection valve is prevented from flowing out into the exhaust passage. Furthermore, since most of the fuel injected from the in-passage injection valve flows out into the exhaust passage, most of the fuel that is burned inside the cylinder is fuel injected from the in-cylinder injection valve. Moreover, the fuel injection from the in-passage injection valve may be started after the intake valve is closed and may be completed until the intake valve is subsequently opened.

In addition, in the present invention, when intake air pressure of the internal combustion engine is higher than atmospheric pressure, air-fuel ratios during combustion inside the cylinder of the internal combustion engine can be made equal between a case where all of the following is performed and a case where any one or more the following is not performed: creating a valve overlap that is a state where the intake valve and the exhaust valve of the internal combustion engine are opened; completing the injection of fuel from the in-passage injection valve during a period in which the intake valve is closed; and completing the injection of fuel from the in-cylinder injection valve during an intake stroke.

In other words, the air-fuel ratio during combustion can be prevented from changing when intake air pressure of the internal combustion engine is higher than atmospheric pressure regardless of whether or not all of the following is performed: creating a valve overlap that is a state where the intake valve and the exhaust valve of the internal combustion engine are opened; completing the injection of fuel from the in-passage injection valve during a period in which the intake valve is closed; and completing the injection of fuel from the in-cylinder injection valve during an intake stroke. By preventing the air-fuel ratio from changing in this manner, an occurrence of misfire can be suppressed and an increase in an exhaust amount of NOx can be prevented. Moreover, the air-fuel ratio during combustion can be determined in accordance with, for example, an operating region of the internal combustion engine (or an operating state of the internal combustion engine).

Furthermore, in the present invention, fuel injection amounts from the in-passage injection valve and the in-cylinder injection valve can be adjusted so that an overall air-fuel ratio that is a value obtained by dividing an intake air amount of the internal combustion engine by a combined fuel injection amount of the fuel injection amount of the in-passage injection valve and the fuel injection amount of the in-cylinder injection valve is a leaner air-fuel ratio than a stoichiometric air-fuel ratio.

When the overall air-fuel ratio is a leaner air-fuel ratio than the stoichiometric air-fuel ratio, since oxygen becomes excessive with respect to fuel at the catalyst having oxidizing ability, the fuel can be prevented from passing through the catalyst. In addition, during a lean burn operation, since the temperature of the catalyst having oxidizing ability is lower than that during an operation at the stoichiometric air-fuel ratio, the temperature of the catalyst can be raised in a wider operating region.

In addition, in the present invention, when intake air pressure of the internal combustion engine is higher than atmospheric pressure, the following can be performed when a temperature of the catalyst having oxidizing ability is equal to or higher than a prescribed temperature at which fuel reacts: creating a valve overlap that is a state where the intake valve and the exhaust valve of the internal combustion engine are opened; completing the injection of fuel from the in-passage injection valve during a period in which the intake valve is closed; and completing the injection of fuel from the in-cylinder injection valve during an intake stroke.

When the temperature of the catalyst having oxidizing ability is not equal to or higher than the prescribed temperature, a temperature rise cannot be expected even if oxygen and fuel are supplied to the catalyst. Therefore, oxygen and fuel are supplied to the catalyst when the temperature of the catalyst is equal to or higher than the prescribed temperature. Accordingly, a situation where fuel is wasted due to the fuel not reacting at the catalyst having oxidizing ability can be prevented.

Furthermore, in the present invention, when intake air pressure of the internal combustion engine is higher than atmospheric pressure, the following can be performed when a temperature of the catalyst having oxidizing ability is equal to or lower than a threshold: creating a valve overlap that is a state where the intake valve and the exhaust valve of the internal combustion engine are opened; completing the injection of fuel from the in-passage injection valve during a period in which the intake valve is closed; and completing the injection of fuel from the in-cylinder injection valve during an intake stroke.

The threshold in this case refers to an upper limit value of a temperature at which there is no risk of overheating of the catalyst or to a temperature having a margin with respect to a temperature at which overheating of the catalyst occurs. Alternatively, an upper limit value of a heat-resistant temperature may be adopted as the threshold. By supplying fuel and oxygen to the catalyst only in such cases, overheating of the catalyst having oxidizing ability can be prevented.

In addition, in the present invention, at least one of an occlusion reduction-type NOx catalyst, a selective reduction-type NOx catalyst, and a filter is provided in the exhaust passage on a downstream side of the catalyst having oxidizing ability, and the control apparatus, in a case where a temperature of at least one of the occlusion reduction-type NOx catalyst, the selective reduction-type NOx catalyst, and the filter is lower than a threshold, may not perform at least one of creating a valve overlap that is a state where the intake valve and the exhaust valve of the internal combustion engine are opened, completing the injection of fuel from the in-passage injection valve during a period in which the intake valve is closed, and completing the injection of fuel from the in-cylinder injection valve during an intake stroke when intake air pressure of the internal combustion engine is higher than atmospheric pressure.

As the threshold described above, a lower limit value of a temperature that enables NOx to be purified at the occlusion reduction-type NOx catalyst or the selective reduction-type NOx catalyst can be adopted. Alternatively, a lower limit value of a temperature that enables recovery from sulfur poisoning at the occlusion reduction-type NOx catalyst or a lower limit value of a temperature that enables PM collected by the filter to be oxidized may be adopted. In other words, by supplying fuel and oxygen to the catalyst having oxidizing ability only when a rise of the temperature of the occlusion reduction-type NOx catalyst, the selective reduction-type NOx catalyst, or the filter causes NOx occluding ability to be improved and enables recovery from sulfur poisoning or regeneration of the filter to be performed, fuel is prevented from being wasted.

Furthermore, in the present invention, at least one of an occlusion reduction-type NOx catalyst, a selective reduction-type NOx catalyst, and a filter is provided in an exhaust passage on a downstream side of the catalyst having oxidizing ability, and the control apparatus, in a case where at least one of the following is not performed when a temperature of at least one of the occlusion reduction-type NOx catalyst, the selective reduction-type NOx catalyst, and the filter is equal to or higher than a target temperature, may not perform one of creating a valve overlap that is a state where the intake valve and the exhaust valve of the internal combustion engine are opened, completing the injection of fuel from the in-passage injection valve during a period in which the intake valve is closed, and completing the injection of fuel from the in-cylinder injection valve during an intake stroke when intake air pressure of the internal combustion engine is higher than atmospheric pressure.

As the target temperature described above, a temperature that enables NOx to be purified by the occlusion reduction-type NOx catalyst or the selective reduction-type NOx catalyst can be adopted. Alternatively, a temperature at which the occlusion reduction-type NOx catalyst recovers from sulfur poisoning or a temperature at which regeneration of the filter is performed may be adopted. In other words, the target temperature refers to a temperature in a case where there is no need to further raise the temperature. By not supplying fuel and oxygen to the catalyst having oxidizing ability once such a temperature is reached, fuel can be prevented from being wasted and overheating of the occlusion reduction-type NOx catalyst, the selective reduction-type NOx catalyst, or the filter can be prevented.

In addition, in the present invention, an amount of fuel injected from the in-passage injection valve can be determined based on a temperature of the catalyst having oxidizing ability and a low calorific value of the fuel.

In this case, the temperature of the catalyst having oxidizing ability is mainly raised by fuel injected from the in-passage injection valve. Therefore, by adjusting the amount of fuel injected from the in-passage injection valve, the temperature of the catalyst having oxidizing ability can be adjusted. In addition, based on the temperature of the catalyst having oxidizing ability and the low calorific value of the fuel, an amount of fuel to be supplied in order to raise the temperature of the catalyst having oxidizing ability to a target temperature can be calculated. Subsequently, by determining the amount of fuel to be injected from the in-passage injection valve based on the temperature of the catalyst having oxidizing ability and the low calorific value of the fuel, the temperature of the catalyst having oxidizing ability can be sufficiently raised.

In addition, in the present invention, the control apparatus may increase a valve overlap amount in a case where all of the following is performed when intake air pressure of the internal combustion engine is higher than atmospheric pressure as compared to a case where any one or more of the following is not performed: creating a valve overlap that is a state where the intake valve and the exhaust valve of the internal combustion engine are opened; completing the injection of fuel from the in-passage injection valve during a period in which the intake valve is closed; and completing the injection of fuel from the in-cylinder injection valve during an intake stroke.

Even when there is no need to supply fuel and oxygen to the catalyst, a valve overlap may occur. However, excessively increasing the valve overlap amount creates a risk of gas after combustion being retained inside the cylinder and making a combustion state unstable. On the other hand, since pressure of intake air is higher than atmospheric pressure when fuel and oxygen are supplied to the catalyst as described above, air is circulated from the intake passage to the exhaust passage through the inside of the cylinder. By increasing the valve overlap amount at this point, more air can be supplied to the catalyst. Accordingly, oxidation of fuel can be promoted. In addition, the fuel inside the intake passage can be prevented from remaining in the intake passage and the cylinder. In other words, when raising the temperature of the catalyst, the temperature of the catalyst can be raised more effectively by increasing the valve overlap amount.

Furthermore, in the present invention, in the internal combustion engine, the exhaust valve opens after the intake valve closes, the intake valve opens after the exhaust valve opens, the exhaust valve closes after the intake valve opens, the intake valve closes after the exhaust valve closes, and the control apparatus:

starts fuel injection from the in-passage injection valve after the intake valve closes and after the exhaust valve opens, or starts fuel injection from the in-passage injection valve after the intake valve closes and before the exhaust valve opens;

completes fuel injection from the in-passage injection valve after fuel injection from the in-passage injection valve is started and before the intake valve opens;

starts fuel injection from the in-cylinder injection valve after the intake valve opens and before the exhaust valve closes, or starts fuel injection from the in-cylinder injection valve after the intake valve opens and after the exhaust valve closes; and completes fuel injection from the in-cylinder injection valve after fuel injection from the in-cylinder injection valve is started and before the intake valve closes.

Either opening of the exhaust valve or start of fuel injection from the in-passage injection valve may occur first. Subsequently, by completing the fuel injection from the in-passage injection valve after the exhaust valve opens and before the intake valve opens, an air-fuel mixture can be retained in the intake passage. In addition, either start of fuel injection from the in-cylinder injection valve or closing of the exhaust valve may occur first. Subsequently, by completing the fuel injection from the in-cylinder injection valve during a period after the intake valve opens and before the intake valve closes and during the intake stroke, diffusion of fuel can be promoted.

Effect of the Invention

According to the present invention, a temperature rise of a catalyst can be promoted.

BRIEF DESCRIPTION OF THE DRAWINGS

FIG. 7 is another time chart showing transitions of respective values when performing temperature rise control according to an embodiment.

MODES FOR CARRYING OUT THE INVENTION

Hereinafter, modes for implementing the invention will be described in detail byway of example of embodiments with reference to the drawings. However, it is to be understood that dimensions, materials, shapes, relative arrangements, and the like of components described in the embodiments are not intended to limit the scope of the invention thereto unless otherwise noted.

First Embodiment

Figure 1:
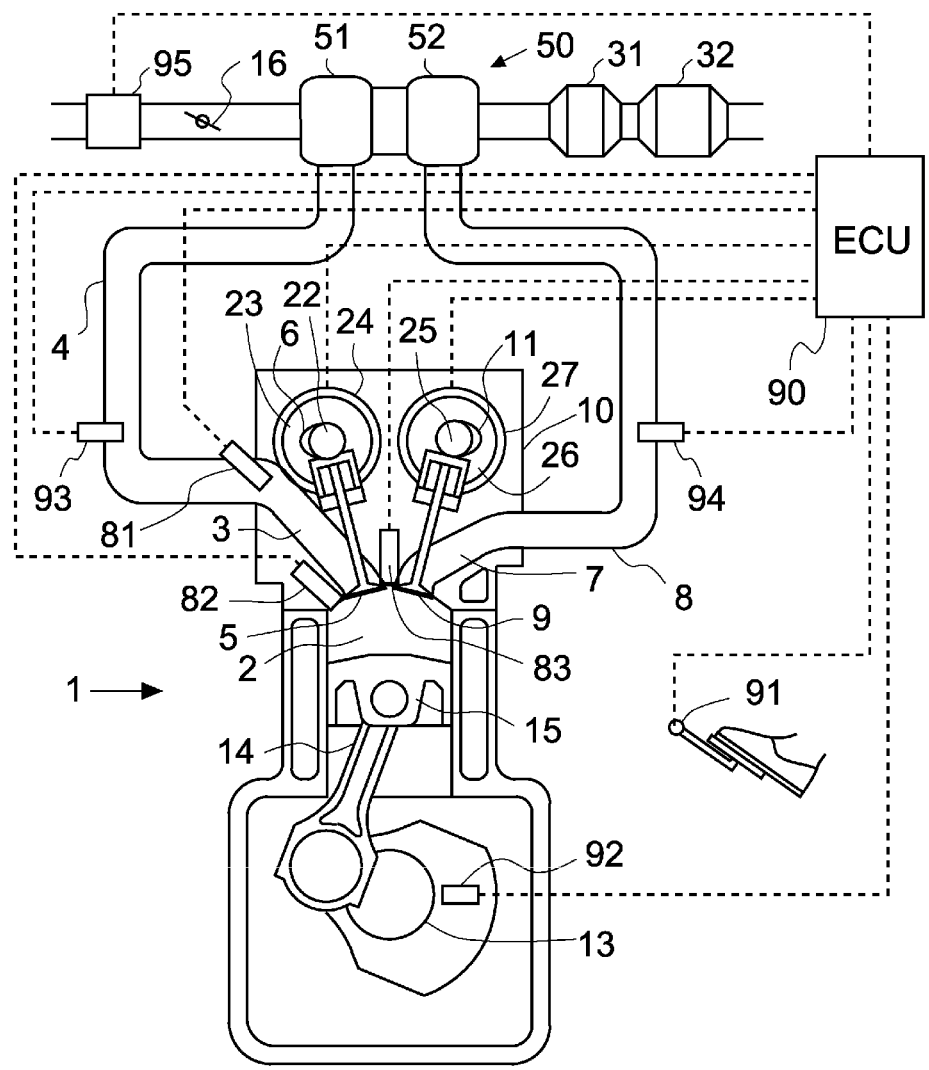
FIG. 1 is a diagram representing a schematic configuration of an internal combustion engine according to an embodiment.

FIG. 1 is a diagram showing a schematic configuration of an internal combustion engine 1 according to the present embodiment. It should be noted that display of some of the components in the present embodiment have been omitted to display the internal combustion engine 1 in a simple manner. The internal combustion engine 1 is a 4-cycle gasoline engine having four cylinders 2.

An intake pipe 4 and an exhaust pipe 8 are connected to a cylinder head 10 of the internal combustion engine 1. An intake port 3 communicating the intake pipe 4 to the inside of the cylinder 2 and an exhaust port 7 communicating the exhaust pipe 8 to the inside of the cylinder 2 are formed in the cylinder head 10. An intake valve 5 is provided at an end of the intake port 3 on the side of the cylinder 2. Opening and closing of the intake valve 5 are performed by an intake-side cam 6. In addition, an exhaust valve 9 is provided at an end of the exhaust port 7 on the side of the cylinder 2. Opening and closing of the exhaust valve 9 are performed by an exhaust-side cam 11.

The intake-side cam 6 is attached to an intake-side camshaft 22 and an intake-side pulley 24 is further provided at an end of the intake-side camshaft 22. A variable rotation phase mechanism (hereinafter, referred to as an "intake-side VVT") 23 capable of changing relative rotational phases of the intake-side camshaft 22 and the intake-side pulley 24 is provided between the intake-side camshaft 22 and the intake-side pulley 24.

In addition, the exhaust-side cam 11 is attached to an exhaust-side camshaft 25 and an exhaust-side pulley 27 is further provided at an end of the exhaust-side camshaft 25. A variable rotation phase mechanism (hereinafter, referred to as an "exhaust-side VVT") 26 capable of changing relative rotational phases of the exhaust-side camshaft 25 and the exhaust-side pulley 27 is provided between the exhaust-side camshaft 25 and the exhaust-side pulley 27.

Furthermore, the intake-side pulley 24 and the exhaust-side pulley 27 rotate by acquiring a drive force from the crankshaft 13. The intake-side VVT 23 is capable of changing opening and closing timings of the intake valve 5 by changing a relationship between a rotational angle of the crankshaft 13 and a rotational angle of the intake-side camshaft 22. In addition, the exhaust-side VVT 26 is capable of changing opening and closing timings of the exhaust valve 9 by changing a relationship between a rotational angle of the crankshaft 13 and a rotational angle of the exhaust-side camshaft 25. In the present embodiment, at least one of the intake-side VVT 23 and the exhaust-side VVT 26 may be provided. In addition, opening and closing timings of the intake valve 5 or the exhaust valve 9 may be changed by another mechanism. Moreover, in the present embodiment, the intake-side VVT 23 or the exhaust-side VVT 26 corresponds to the variable valve apparatus according to the present invention.

In addition, a piston 15 that is coupled to the crankshaft 13 of the internal combustion engine 1 via a connecting rod 14 reciprocates in the cylinder 2.

A compressor housing 51 of a turbocharger 50 that operates using energy of exhaust gas as a drive source is provided midway along the intake pipe 4. Moreover, in the present embodiment, the turbocharger 50 corresponds to the supercharger according to the present invention. While a turbocharger is used in the present embodiment, a mechanical supercharger that is driven by the crankshaft 13 may be used instead.

In addition, a throttle 16 that adjusts an amount of intake air flowing through the intake pipe 4 is provided in the intake pipe 4 on an upstream side of the compressor housing 51. An air flow meter 95 that outputs a signal in accordance with an amount of air flowing inside the intake pipe 4 is provided in the intake pipe 4 on an upstream side of the throttle 16. An intake air amount of the internal combustion engine 1 is detected by the air flow meter 95. Furthermore, an intake pressure sensor 93 that measures pressure inside the intake pipe 4 is provided in the intake pipe 4 on a downstream side of the compressor housing 51. In addition, an exhaust pressure sensor 94 that measures pressure inside the exhaust pipe 8 is provided in the exhaust pipe 8 on an upstream side of a turbine housing 52. Moreover, the intake pressure sensor 93 and the exhaust pressure sensor 94 detect relative pressure with respect to atmospheric pressure.

Meanwhile, the turbine housing 52 of the turbocharger 50 is provided midway along the exhaust pipe 8. A three-way catalyst 31 is provided in the exhaust pipe 8 on a downstream side of the turbine housing 52. Moreover, the three-way catalyst 31 need only be a catalyst having oxidizing ability and may be an oxidation catalyst or a NOx catalyst. In the present embodiment, the three-way catalyst 31 corresponds to the catalyst having oxidizing ability according to the present invention. In addition, an occlusion reduction-type NOx catalyst 32 (hereinafter, referred to as a NOx catalyst 32) is provided in the exhaust pipe 8 on a downstream side of the three-way catalyst 31. The NOx catalyst 32 occludes NOx in exhaust gas when oxygen concentration of exhaust gas flowing in is high and reduces occluded NOx when oxygen concentration of exhaust gas flowing in is low and when a reducing agent is present. Moreover, another catalyst (for example, a selective reduction-type NOx catalyst) can be provided in place of the NOx catalyst 32. In addition, a filter that collects particulate matter in exhaust gas can also be provided. The filter may carry a catalyst.

An in-passage injection valve 81 that injects fuel toward the intake port 3 is attached to the intake pipe 4 in a vicinity of the internal combustion engine 1. In addition, an in-cylinder injection valve 82 that injects fuel into the cylinder 2 is attached to the internal combustion engine 1. Furthermore, a spark plug 83 that generates an electric spark inside the cylinder 2 is attached to the internal combustion engine 1.

In addition, the internal combustion engine 1 is provided with an ECU 90 that is an electronic control device for controlling the internal combustion engine 1. The ECU 90 includes a CPU as well as a ROM, a RAM, and the like which store various programs and maps, and controls the internal combustion engine 1 in accordance with an operating condition of the internal combustion engine 1 or in response to a request from a driver.

In addition to the various sensors described above, an accelerator depression amount sensor 91 and a crank position sensor 92 are electrically connected to the ECU 90. The ECU 90 receives a signal in accordance with an accelerator depression amount from the accelerator depression amount sensor 91 and calculates an engine load or the like that is required by the internal combustion engine 1 in accordance with the signal. In addition, the ECU 90 receives a signal in accordance with a rotational angle of an output shaft of the internal combustion engine 1 from the crank position sensor 92 and calculates an engine rotational speed of the internal combustion engine 1.

Meanwhile, the intake-side VVT 23, the exhaust-side VVT 26, the in-passage injection valve 81, the in-cylinder injection valve 82, and the spark plug 83 are connected via electric wiring to the ECU 90 and are controlled by the ECU 90.

In addition, the ECU 90 performs temperature rise control when it is necessary to raise a temperature of the three-way catalyst 31 or the NOx catalyst 32. When temperature rise control is performed, a valve overlap amount is increased and, at the same time, an amount of fuel injected from the in-passage injection valve 81 is increased as compared to when temperature rise control is not performed. Moreover, when temperature rise control is not performed, fuel injection from the in-passage injection valve 81 may be prohibited. In this case, fuel is injected from the in-passage injection valve 81 when performing temperature rise control. In addition, fuel is injected from the in-passage injection valve 81 during a period in which the intake valve 5 is completely closed and fuel is injected from the in-cylinder injection valve 82 during an intake stroke. In other words, the intake valve 5 is not opened from start to end of fuel injection from the in-passage injection valve 81. Accordingly, fuel injected from the in-passage injection valve 81 is retained in the intake port 3. On the other hand, by injecting fuel from the in-cylinder injection valve 82 during the intake stroke, fuel injected from the in-cylinder injection valve 82 can be prevented from flowing out to the exhaust port 7.

Furthermore, in the present embodiment, when the intake pressure sensor 93 indicates positive pressure (in other words, when intake air pressure is higher than atmospheric pressure), a supercharged state is assumed and temperature rise control is performed. Moreover, when the engine rotational speed increases, pressure inside the exhaust port 7 rises and a difference from pressure inside the intake port 3 decreases. Accordingly, it becomes difficult for air to pass through to the exhaust port 7 from the intake port 3. In contrast, in the present embodiment, temperature rise control is performed when the engine rotational speed is relatively low.

Figure 2:
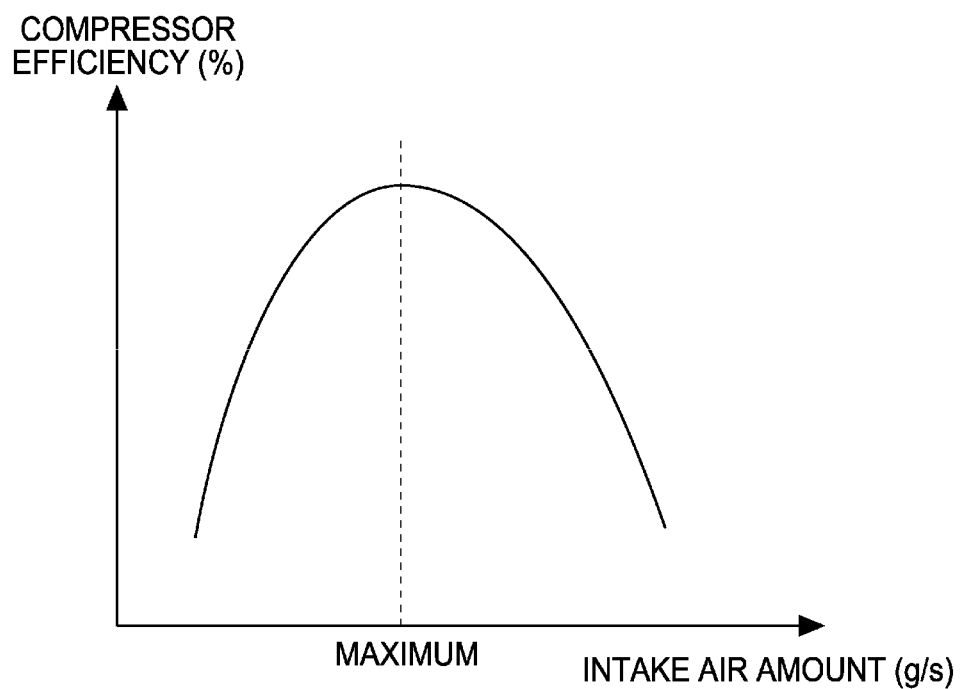
FIG. 2 is a diagram showing a relationship between an intake air amount and compressor efficiency.

FIG. 2 is a diagram showing a relationship between an intake air amount and compressor efficiency. As shown in FIG. 2, compressor efficiency is determined by intake air amount. In addition, there exists an intake air amount that maximizes compressor efficiency in the turbocharger 50. In other words, compressor efficiency declines both when an actual intake air amount is larger than and when an actual intake air amount is larger smaller than the intake air amount that maximizes compressor efficiency. Generally, a turbocharger is selected so that an intake air amount that maximizes compressor efficiency conforms to an intake air amount of a desired engine rotational speed. For example, a turbocharger is selected such that compressor efficiency is maximized at a low rotation. Therefore, compressor efficiency increases at a low rotation. On the other hand, at a high rotation, an increase in a flow rate of exhaust gas causes pressure of exhaust gas to rise. In this case, pressure of exhaust gas may exceed pressure of intake air. In such a state, air does not flow from the intake port 3 to the exhaust port 7 even if the valve overlap amount is increased. In addition, even at a low rotation, air does not flow from the intake port 3 to the exhaust port 7 if a supercharged state does not exist. Therefore, in the present embodiment, temperature rise control is performed when the engine rotational speed is relatively low and, at the same time, when a supercharged state exists. While the engine rotational speed is, for example, 2000 rpm or less, since this value changes according to characteristics of the turbocharger, an optimum value is to be obtained in advance by an experiment, a simulation, or the like.

Figure 3:
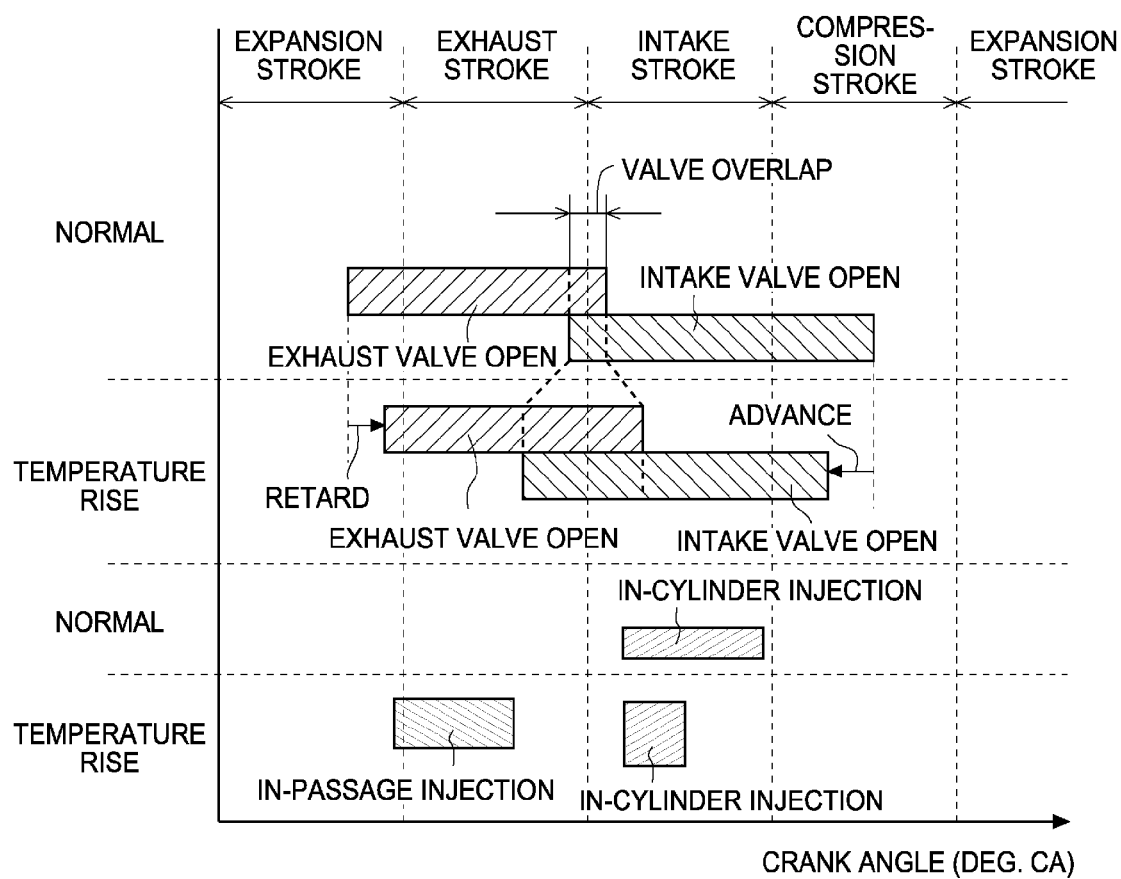
FIG. 3 is a diagram showing timings at which an intake valve and an exhaust valve are opened and timings at which fuel is injected from an in-passage injection valve and an in-cylinder injection valve with respect to crank angles.

FIG. 3 is a diagram showing timings at which the intake valve 5 and the exhaust valve 9 are opened and timings at which fuel is injected from the in-passage injection valve 81 and the in-cylinder injection valve 82 with respect to crank angles. A crank angle is at 0 upon start of an expansion stroke. In other words, the crank angle at a compression top dead center is set to 0. Moreover, periods in which temperature rise control is performed are denoted as "temperature rise", and periods in which temperature rise control is not performed are assumed to be under normal control and are denoted as "normal".

During normal control and during temperature rise control, the exhaust valve 9 is opened from a second half of the expansion stroke to a first half of the intake stroke. In addition, during normal control and during temperature rise control, the intake valve 5 is opened from a second half of the exhaust stroke to midway of the compression stroke. Therefore, during normal control and during temperature rise control, both the exhaust valve 9 and the intake valve 5 are opened from shortly before the end of the exhaust stroke to shortly after the start of the intake stroke. This period in which both the exhaust valve 9 and the intake valve 5 are opened is a valve overlap amount.

In addition, the exhaust valve 9 starts to open at a later timing during temperature rise control than during normal control. A timing at which the exhaust valve 9 closes also arrives later during temperature rise control than during normal control. In other words, opening and closing timings of the exhaust valve 9 are retarded during temperature rise control. In addition, the intake valve 5 starts to open at an earlier timing during temperature rise control than during normal control. A timing at which the intake valve 5 closes also arrives earlier during temperature rise control than during normal control. In other words, opening and closing timings of the intake valve 5 are advanced during temperature rise control. As a result, the valve overlap amount is larger during temperature rise control than during normal control.

In addition, during normal control, fuel is not injected from the in-passage injection valve 81 and is only injected from the in-cylinder injection valve 82. In this case, fuel is injected during the intake stroke. For example, when the internal combustion engine 1 is operated in a vicinity of the stoichiometric air-fuel ratio, since temperature of exhaust gas is high, there is a risk that the three-way catalyst 31 may become overheated if intake air passes through the cylinder 2 together with fuel injected from the in-passage injection valve 81 and reaches the three-way catalyst 31. In contrast, by not injecting fuel from the in-passage injection valve 81, overheating of the three-way catalyst 31 can be prevented.

On the other hand, during temperature rise control, fuel is also injected from the in-passage injection valve 81. A timing at which fuel is injected from the in-passage injection valve 81 is earlier than a period in which a valve overlap occurs or, in other words, before the intake valve 5 opens. Moreover, the timing at which fuel injection from the in-passage injection valve 81 is started may be before the exhaust valve opens or after the exhaust valve opens. In this manner, during temperature rise control, fuel is prevented from being injected from the in-passage injection valve 81 when the intake valve 5 is open. In addition, a timing at which fuel is injected from the in-cylinder injection valve 82 is during the intake stroke. In other words, at this timing, the piston 15 is descending and fuel injected from the in-cylinder injection valve 82 is unlikely to flow out to the intake port 3 and the exhaust port 7. Moreover, the timing at which fuel injection from the in-cylinder injection valve 82 is started may be before the exhaust valve opens or after the exhaust valve opens. While fuel may also be injected from the in-passage injection valve 81 during normal control, in this case, a fuel injection amount is reduced as compared to during temperature rise control. Accordingly, fuel reaching the three-way catalyst 31 is reduced.

In the present embodiment, temperature rise control is performed in a supercharged state where pressure of intake air is higher than atmospheric pressure. By increasing the valve overlap amount in a supercharged state, an amount of air that passes through the cylinder 2 and flows from the side of the intake pipe 4 to the side of the exhaust pipe 8 increases when there is a valve overlap. In addition, by injecting fuel from the in-passage injection valve 81 during a period in which the intake valve 5 is closed, fuel promptly moves from the intake port 3 to the exhaust port 7 once the intake valve 5 opens. Furthermore, by increasing the valve overlap amount, since a large amount of air flows out to the exhaust port 7 as-is, a larger amount of fuel injected from the in-passage injection valve 81 flows out toward the side of the exhaust port 7. In other words, by increasing the valve overlap amount, fuel injected from the in-passage injection valve 81 can be prevented from remaining in the intake port 3 and the cylinder 2.

Subsequently, the fuel that flows out to the exhaust port 7 when there is a valve overlap flows through the exhaust pipe 8 and into the three-way catalyst 31. Since a large amount of oxygen having passed through the cylinder 2 is contained in the exhaust gas that flows into the three-way catalyst 31 at this point, fuel and oxygen react at the three-way catalyst 31 and heat is generated. Due to the heat, temperatures of the three-way catalyst 31 and the NOx catalyst 32 can be raised. In addition, since fuel is more likely to be oxidized due to the large amount of oxygen, unburned fuel can be prevented from being released into the atmosphere.

Assuming that a value obtained by dividing a "sum of an amount of air remaining in the cylinder 2 and an amount of air that passes through the cylinder 2" by a "sum of a fuel injection amount from the in-passage injection valve 81 and a fuel injection amount from the in-cylinder injection valve 82" represents an overall air-fuel ratio, the overall air-fuel ratio is adjusted to be a leaner air-fuel ratio than the stoichiometric air-fuel ratio. Moreover, the "sum of an amount of air remaining in the cylinder 2 and an amount of air that passes through the cylinder 2" may be an intake air amount that is detected by the air flow meter 95.

In addition, assuming that a value obtained by dividing an amount of air remaining in the cylinder 2 by a fuel injection amount from the in-cylinder injection valve 82 represents an in-cylinder air-fuel ratio, the in-cylinder air-fuel ratio is adjusted to be a leaner air-fuel ratio than the stoichiometric air-fuel ratio. Moreover, a target air-fuel ratio that is a target value of the in-cylinder air-fuel ratio is set to, for example, 25. The target value of the in-cylinder air-fuel ratio is set to a same value regardless of whether or not temperature rise control is to be performed. In other words, the target value of the in-cylinder air-fuel ratio does not change regardless of whether a transition is made from normal control to temperature rise control or a transition is made from temperature rise control to normal control. The target value of the in-cylinder air-fuel ratio when temperature rise control is to be performed is the same as the target value of the in-cylinder air-fuel ratio when assuming that the temperature rise control is not to be performed at the same time point. Since output and torque of the internal combustion engine 1 can be kept unchanged in this manner, a decline in drivability can be prevented. Moreover, the target value of the in-cylinder air-fuel ratio can be determined in accordance with an operating state (for example, an engine rotational speed and an engine load) of the internal combustion engine 1. An optimum value of the target value of the in-cylinder air-fuel ratio may be obtained in advance by an experiment or a simulation and stored in the ECU 90.

The ECU 90 calculates an amount of air having passed through the cylinder 2 based on a difference in pressure between the intake port 3 and the exhaust port 7. In other words, since the difference in pressure between the intake port 3 and the exhaust port 7 is related to an amount of air having passed through the cylinder 2 when there is a valve overlap, the amount of air having passed through the cylinder 2 when there is a valve overlap can be calculated based on a difference in pressure between the intake port 3 and the exhaust port 7. Moreover, a relationship between the difference in pressure between the intake port 3 and the exhaust port 7 and the amount of air having passed through the cylinder 2 may be obtained in advance by an experiment, a simulation, or the like and stored in the ECU 90. In addition, the amount of air remaining in the cylinder 2 can be obtained by subtracting the amount of air having passed through the cylinder 2 from the intake air amount detected by the air flow meter 95.

Moreover, a fuel injection amount from the in-passage injection valve 81 is assumed to be an amount that does not cause the three-way catalyst 31 to overheat. For example, an amount of fuel that can be increased can be calculated from a low calorific value of fuel and a difference between temperature of the three-way catalyst 31 at the present moment and heat-resistant temperature, and an increase rate of the fuel injection amount from the in-passage injection valve 81 can be obtained based on the amount of fuel that can be increased. This relationship may be obtained in advance by an experiment or a simulation.

In addition, the in-cylinder air-fuel ratio is adjusted by a fuel injection amount from the in-cylinder injection valve 82. Most of the fuel injected from the in-passage injection valve 81 flows to the exhaust pipe 8 in a period in which there is a valve overlap. Therefore, fuel injected from the in-passage injection valve 81 hardly affects the air-fuel ratio in the cylinder 2. Therefore, when calculating the in-cylinder air-fuel ratio, the fuel injection amount from the in-cylinder injection valve 82 need only be considered and the fuel injection amount from the in-passage injection valve 81 need not be considered.

In addition, the valve overlap amount may be set to be larger during temperature rise control than during normal control (when temperature rise control is not performed). Furthermore, the valve overlap amount may be set as large as possible during temperature rise control. When pressure of intake air is higher than pressure of exhaust gas, the larger the valve overlap amount, the larger the amount of air that passes through the cylinder 2. Accordingly, since larger amounts of fuel and oxygen can be supplied to the three-way catalyst 31, temperature rise of the three-way catalyst 31 and the NOx catalyst 32 can be further promoted.

On the other hand, when not in a supercharged state or when the engine rotational speed is relatively high even in a supercharged state, since pressure of exhaust gas is higher than pressure of intake air, the larger the valve overlap amount, the larger a residual amount of gas (internal EGR gas amount) after combustion in the cylinder 2. As a result, the intake air amount decreases. Therefore, a timing at which the exhaust valve 9 opens is advanced during normal control. On the other hand, opening and closing timings of the intake valve 5 during normal control are determined in consideration of the intake air amount and the internal EGR gas amount.

Figure 4:
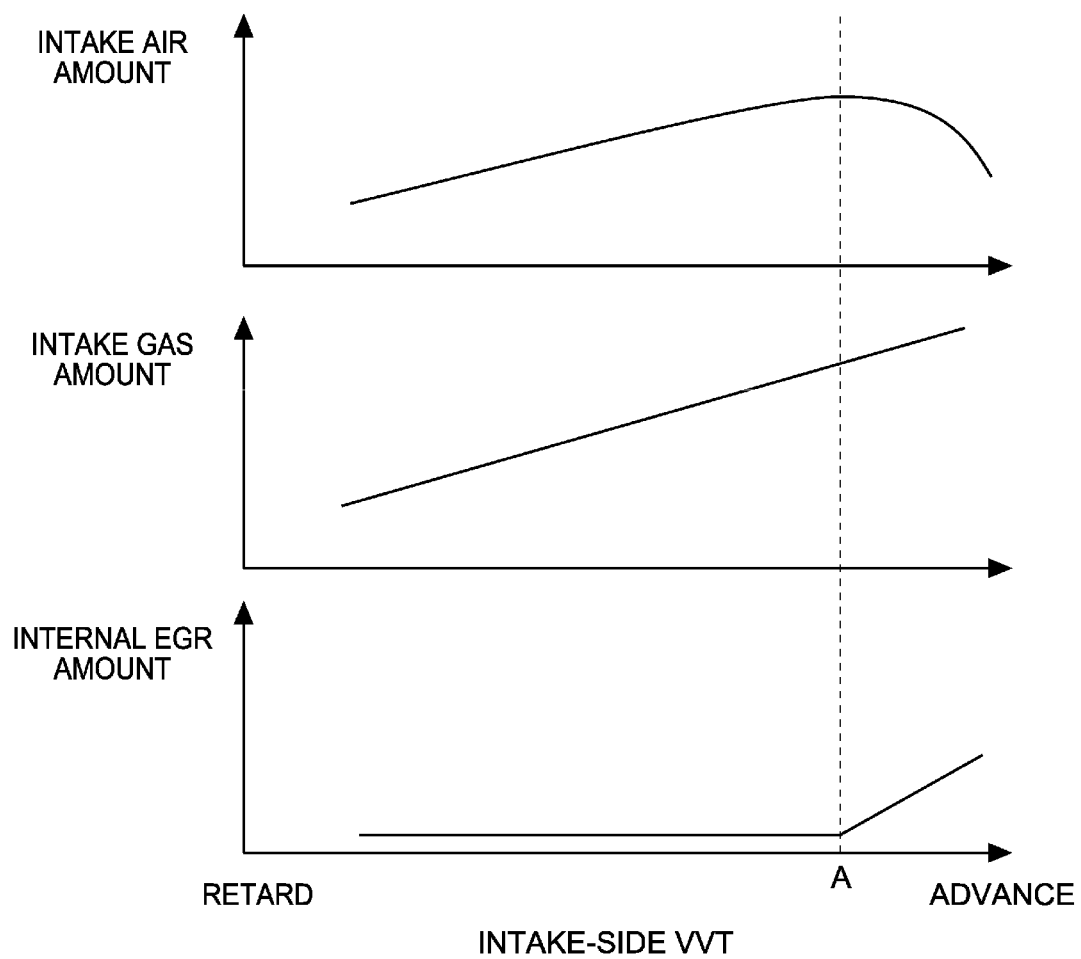
FIG. 4 is a diagram showing an intake air amount, an intake gas amount, and an internal EGR amount with respect to a degree of advancement of a valve timing at an intake-side VVT.

FIG. 4 is a diagram showing an intake air amount, an intake gas amount, and an internal EGR amount with respect to a degree of advancement of a valve timing at the intake-side VVT 23. The intake air amount is an amount of air that is taken into the cylinder 2. The intake gas amount is a sum of the amount of air inside the cylinder 2 and the internal EGR gas amount. Internal EGR gas refers to gas after combustion inside the cylinder 2 that remains in the cylinder 2. The internal EGR gas also contains gas that returns to the inside of the cylinder 2 after flowing out to the intake port 3 or the exhaust port 7.

In FIG. 4, the intake air amount reaches maximum at a degree of advancement denoted as A. A valve overlap occurs on an advance side of the degree of advancement at which the intake air amount is maximum. When a valve overlap occurs, the internal EGR gas amount increases. In other words, when opening and closing timings of the intake valve 5 are excessively advanced, the internal EGR gas amount increases, and when opening and closing timings of the intake valve 5 are excessively retarded, the intake air amount decreases. Therefore, opening and closing timings of the intake valve 5 are determined in consideration of the intake air amount and the internal EGR gas amount. The opening and closing timings of the intake valve 5 are obtained in advance by an experiment or a simulation and stored in the ECU 90.

In addition, temperature rise control may be ended when temperature of the NOx catalyst 32 reaches target temperature. For example, the target temperature may be a temperature within a range of a purification window and may be, for example, 400° C. Furthermore, temperature rise control may be performed when the temperature of the NOx catalyst 32 is lower than a lower limit value (for example, 300° C.) of the purification window. By performing temperature rise control when the temperature of the NOx catalyst 32 is lower than the lower limit value of the purification window, purification performance of the NOx catalyst 32 can be increased. In addition, the fuel injection amount from the in-passage injection valve 81 may be adjusted so that the temperature of the NOx catalyst 32 equals a temperature at which an occlusion amount of NOx reaches maximum. An amount of NOx that can be occluded in the NOx catalyst 32 changes in accordance with the temperature of the NOx catalyst 32, and the amount of NOx that can be occluded decreases when the temperature of the NOx catalyst 32 is both higher and lower than a prescribed temperature. By adjusting the fuel injection amount from the in-passage injection valve 81 so that the temperature of the NOx catalyst 32 equals the prescribed temperature, a NOx purification rate of the NOx catalyst 32 can be improved.

Figure 5:
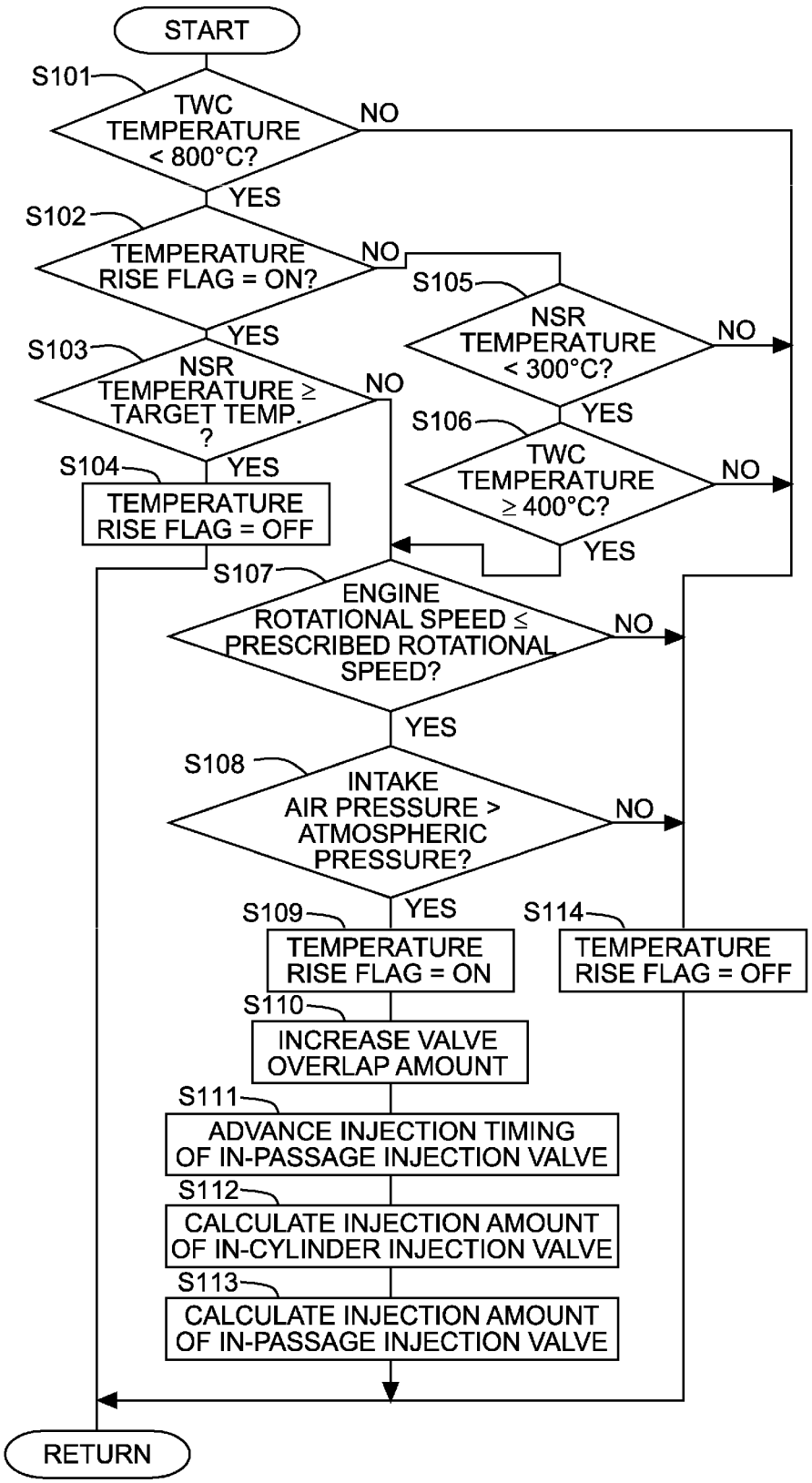
FIG. 5 is a flow chart showing a flow of temperature rise control according to an embodiment.

FIG. 5 is a flow chart showing a flow of temperature rise control according to the present embodiment. The present routine is executed every prescribed time by the ECU 90.

In step S101, a determination is made on whether or not temperature of the three-way catalyst 31 (TWC temperature) is lower than a prescribed temperature (for example, 800° C.). The prescribed temperature in this case is a lower limit value of temperature at which the three-way catalyst 31 may possibly overheat and may be, for example, 800° C. The prescribed temperature is set lower than a temperature at which a base material of the three-way catalyst 31 erodes. When the temperature of the three-way catalyst 31 is equal to or higher than the prescribed temperature, temperature rise control is not performed in order to prevent overheating of the three-way catalyst 31. In other words, in the present step, a determination is made on whether or not a temperature rise of the three-way catalyst 31 is possible. Since there may be cases where the temperature of the three-way catalyst 31 is high even when the temperature of the NOx catalyst 32 is low, overheating of the three-way catalyst 31 in such a case is prevented in the present step. When a positive determination is made in step S101, the present routine advances to step S102, and when a negative determination is made, the present routine advances to step S114.

In step S102, a determination is made on whether or not a temperature rise flag is turned on. The temperature rise control according to the present embodiment is performed when the temperature rise flag is turned on and is not performed when the temperature rise flag is turned off. In the present embodiment, a determination is made on whether or not temperature rise control has been performed. When a positive determination is made in step S102, the present routine advances to step S103, and when a negative determination is made, the present routine advances to step S105.

In step S103, a determination is made on whether or not temperature of the NOx catalyst 32 (NSR temperature) is equal to or higher than a target temperature (for example, 400° C.). The target temperature in this case is a temperature that is lower than an upper limit value of the purification window of the NOx catalyst 32 and is a temperature within the purification window. Since the purification window of the NOx catalyst 32 is, for example, 300° C. to 450° C., the target temperature is set in this range. In other words, in the present step, a determination is made on whether or not the temperature of the NOx catalyst 32 is sufficiently high and there is no need to further raise the temperature. When a positive determination is made in step S103, the present routine advances to step S104, and when a negative determination is made, the present routine advances to step S107.

In step S104, the temperature rise flag is turned off. In other words, since the temperature of the NOx catalyst 32 need not be raised, the temperature rise flag is turned off.

In step S105, a determination is made on whether or not the temperature of the NOx catalyst 32 (NSR temperature) is lower than a lower limit value of the purification window (for example, 300° C.). In the present step, a determination is made on whether or not temperature of the NOx catalyst 32 is so low that NOx cannot be purified by the NOx catalyst 32. In other words, in the present step, a determination is made on whether or not the temperature of the NOx catalyst 32 needs to be raised. When a positive determination is made in step S105, the present routine advances to step S106, and when a negative determination is made, the present routine advances to step S114.

In step S106, a determination is made on whether or not temperature of the three-way catalyst 31 (TWC temperature) is higher than a prescribed temperature (for example, 400° C.). The prescribed temperature in this case is a lower limit value of a temperature at which fuel sufficiently reacts at the three-way catalyst 31. In other words, in the present step, a determination is made on whether or not fuel supplied from the in-passage injection valve 81 reacts at the three-way catalyst 31. When the fuel does not sufficiently react at the three-way catalyst 31, since the fuel may possibly pass through the three-way catalyst 31, temperature rise control is not performed. When a positive determination is made in step S106, the present routine advances to step S107, and when a negative determination is made, the present routine advances to step S114.

In step S107, a determination is made on whether or not the engine rotational speed is equal to or lower than a prescribed rotational speed (for example, 3000 rpm). The prescribed rotational speed in this case is an upper limit value of an engine rotational speed at which the temperature rise control according to the present embodiment can be performed. The prescribed rotational speed is determined in consideration of compressor efficiency. In other words, in the present step, a determination is made on whether or not the engine rotational speed enables temperature rise control to be performed. When a positive determination is made in step S107, the present routine advances to step S108, and when a negative determination is made, the present routine advances to step S114.

In step S108, a determination is made on whether or not intake air pressure is higher than atmospheric pressure. In the present step, a determination is made on whether or not a supercharged state exists. In other words, a determination is made on whether or not a state exists where, when there is a valve overlap, air flows into the cylinder 2 from the intake port 3 and further flows out from the cylinder 2 to the exhaust port 7. When a positive determination is made in step S108, the present routine advances to step S109, and when a negative determination is made, the present routine advances to step S114.

In step S109, the temperature rise flag is turned on. In other words, since the temperature of the NOx catalyst 32 needs to be raised, the temperature rise flag is turned on to perform temperature rise control.

In step S110, a valve overlap amount is increased. In the present step, at least one of advancing an opening timing of the intake valve 5 or retarding a closing timing of the exhaust valve 9 is performed. For example, the valve overlap amount may be obtained in advance by an experiment, a simulation, or the like and stored in the ECU 90 in association with an operating state of the internal combustion engine 1. In addition, the valve overlap amount may be set to a value at which a maximum amount of air passes through the cylinder 2.

When pressure inside the intake port 3 is higher than pressure inside the exhaust port 7, the larger the valve overlap amount, the larger the amount of air that passes through the cylinder 2 and the larger the intake air amount. Therefore, the intake air amount may be maximized by advancing the opening and closing timings of the intake valve 5 as much as possible and retarding the opening and closing timings of the exhaust valve 9 as much as possible.

In step S111, a fuel injection timing of the in-passage injection valve 81 is advanced. In the present step, the fuel injection timing is changed so that fuel injection from the in-passage injection valve 81 is concluded at a timing when the intake valve 5 is closed. Moreover, a start timing and an end timing of fuel injection from the in-passage injection valve 81 are not particularly specified as long as the timings are at timings when the intake valve 5 does not open when fuel is being injected from the in-passage injection valve 81.

In step S112, a fuel injection amount from the in-cylinder injection valve 82 is calculated. The fuel injection amount from the in-cylinder injection valve 82 may be obtained by dividing an amount of air inside the cylinder 2 by a target air-fuel ratio (for example, 25). The amount of air in the cylinder 2 is obtained by subtracting the amount of air having passed through the cylinder 2 from the intake air amount detected by the air flow meter 95. Since the amount of air having passed through the cylinder 2 is related to a difference in pressure between the intake pipe 4 and the exhaust pipe 8, the amount of air is calculated based on the pressure difference.

In step S113, a fuel injection amount from the in-passage injection valve 81 is calculated. In the present step, the fuel injection amount from the in-passage injection valve 81 is set to a fuel injection amount suitable for temperature rise of the three-way catalyst 31 and the NOx catalyst 32. In other words, the fuel injection amount from the in-passage injection valve 81 is determined so that the overall air-fuel ratio becomes a leaner air-fuel ratio than the stoichiometric air-fuel ratio. An optimum value of the target value of the overall air-fuel ratio may be obtained in advance by an experiment or a simulation and stored in the ECU 90. Subsequently, the present routine is ended.

On the other hand, in step S114, the temperature rise flag is turned off. Accordingly, normal control is performed. In this case, normal control refers to control when temperature rise control is not performed. This control includes control of opening and closing timings of the intake valve 5 and the exhaust valve 9 and control of fuel injection timings and fuel injection amounts from the in-passage injection valve 81 and the in-cylinder injection valve 82. In normal control, opening and closing timings of the intake valve 5 and the exhaust valve 9 as well as fuel injection timings and fuel injection amounts from the in-passage injection valve 81 and the in-cylinder injection valve 82 are set in accordance with a map stored in the ECU 90 in advance. Moreover, fuel injection from the in-passage injection valve 81 may be prohibited in order to prevent fuel from flowing out to the exhaust port 7.

Figure 6:
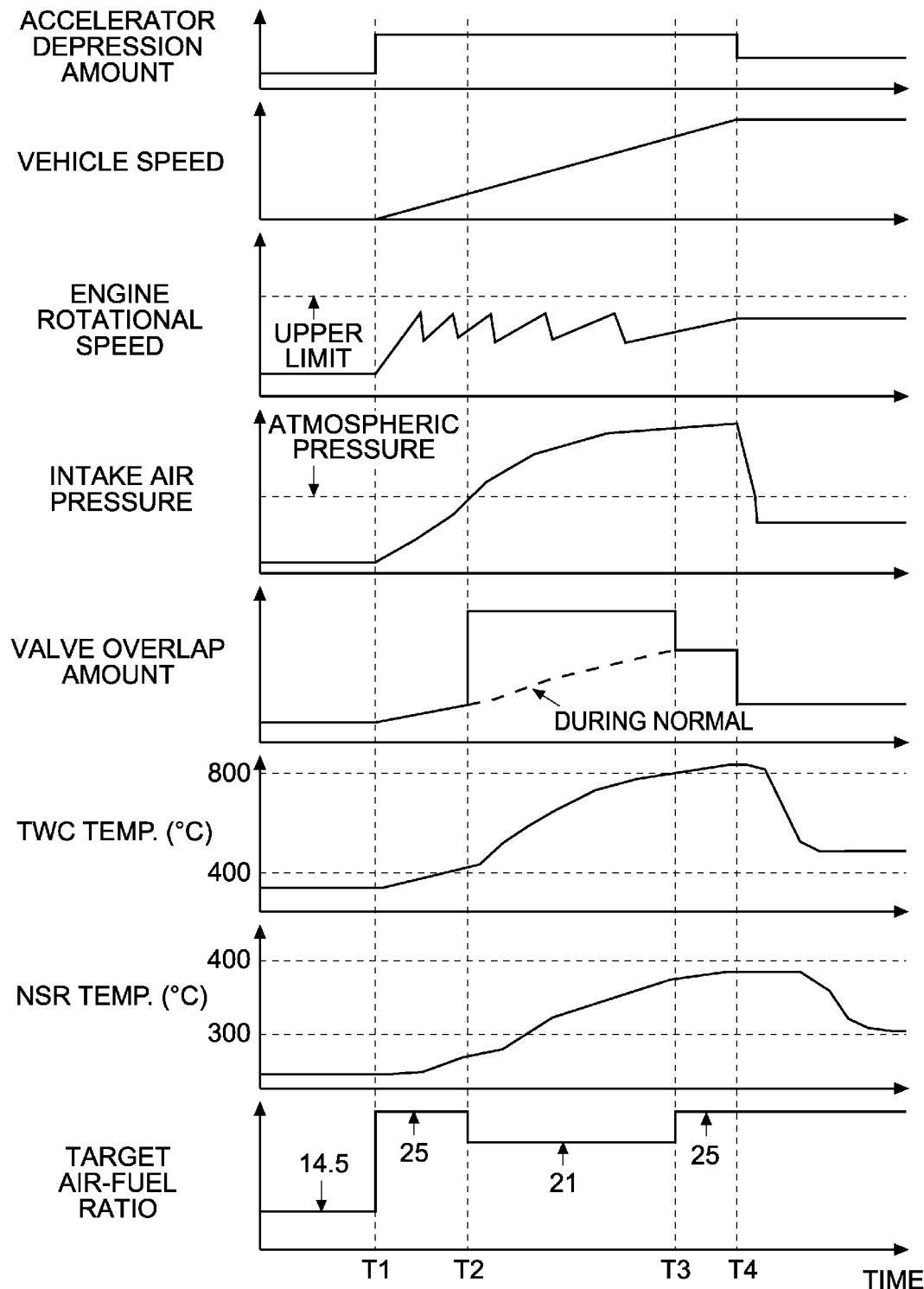
FIG. 6 is a time chart showing transitions of respective values when performing temperature rise control according to an embodiment.

FIG. 6 is a time chart showing transitions of respective values when performing temperature rise control according to the present embodiment. "Accelerator depression amount" represents a detection value of the accelerator depression amount sensor 91. "Vehicle speed" represents a speed of a vehicle to which the internal combustion engine 1 is mounted. "Engine rotational speed" represents a rotational speed per minute of the internal combustion engine 1, and "upper limit" represents an upper limit value of an engine rotational speed that enables temperature rise control to be performed. "During normal" in "valve overlap amount" represents a valve overlap amount when temperature rise control is assumed not to be performed or, in other words, when normal control is assumed to be performed. "Intake air pressure" represents a detection value of the intake pressure sensor 93. "TWC temperature" represents temperature of the three-way catalyst 31 and "NSR temperature" represents temperature of the NOx catalyst 32. "Target air-fuel ratio" represents a target value of the overall air-fuel ratio. An optimum value of the target air-fuel ratio is to be obtained in advance by an experiment or a simulation.

In FIG. 6, T1 denotes a time point when an accelerator depression amount starts to be increased and when speed of the vehicle starts to increase. Intake air pressure rises due to an increase in load from time point T1 and reaches atmospheric pressure at time point T2. In a period from T1 to T2, the target air-fuel ratio is set to, for example, 25.

From time point T2, a supercharged state where intake air pressure exceeds atmospheric pressure is created. At this point, since the temperature of the three-way catalyst 31 and the temperature of the NOx catalyst 32 are low, a valve overlap amount is increased. Subsequently, at a time point denoted by T3, the temperature of the three-way catalyst 31 reaches the prescribed temperature (for example, 800° C.) described in step S101. As a result, at time point T3, a negative determination is made in step S101 and a transition is made to normal control. In other words, temperature rise control is performed in a period from T2 to T3. Due to the temperature rise control, temperatures of the three-way catalyst 31 and the NOx catalyst 32 rise. The target air-fuel ratio at this point is set to, for example, 21. In addition, from time point T3, the valve overlap amount is set to a same value as during normal control.

Subsequently, at a time point denoted by T4, the accelerator depression amount is reduced and subsequently set constant. Accordingly, vehicle speed becomes constant and intake air pressure falls below atmospheric pressure. In a period from T3 to T4, the target air-fuel ratio is set to, for example, 25. In other words, during acceleration of the vehicle, the target air-fuel ratio is set to, for example, 21 during a period in which temperature rise control is performed and the target air-fuel ratio is set to, for example, 25 during a period in which temperature rise control is not performed.

Moreover, before time point T1, the target air-fuel ratio is set to, for example, the stoichiometric air-fuel ratio. At this point, when fuel injected from the in-passage injection valve 81 reaches the three-way catalyst 31, the three-way catalyst 31 may possibly overheat. Therefore, in order to prevent fuel from flowing toward the exhaust pipe 8, fuel injection from the in-passage injection valve 81 is prohibited and fuel is only injected from the in-cylinder injection valve 82.

FIG. 7 is another time chart showing transitions of respective values when performing temperature rise control according to the present embodiment. The only differences from the time chart shown in FIG. 6 are TWC temperature and NSR temperature.

In the time chart shown in FIG. 6, at time point T3, the temperature of the three-way catalyst 31 is equal to or higher than the prescribed temperature (for example, 800° C.) described in step S101. However, in the time chart shown in FIG. 7, at time point T3, the temperature of the NOx catalyst 32 is equal to or higher than the prescribed temperature (for example, 400° C.) described in step S103. As a result, at time point T3, a positive determination is made in step S103 and a transition is made to normal control. In other words, normal control is performed from time point T3 shown in FIG. 7.

When the in-cylinder air-fuel ratio becomes higher than the target air-fuel ratio, misfire is more likely to occur, and when the in-cylinder air-fuel ratio becomes lower than the target air-fuel ratio, an exhaust amount of NOx may increase. In contrast, the in-cylinder air-fuel ratio can be adjusted by the in-cylinder injection valve 82. In addition, since fuel injected from the in-cylinder injection valve 82 is unlikely to flow out toward the exhaust pipe 8, the in-cylinder air-fuel ratio can be set to a target value with high accuracy. Therefore, an occurrence of misfire can be prevented or NOx emission can be reduced.

In addition, since fuel injection from the in-passage injection valve 81 ends when the intake valve 5 is closed, fuel injected from the in-passage injection valve 81 remains in a vicinity of the intake valve 5 as an air-fuel mixture. Subsequently, when the intake valve 5 opens, most of the air-fuel mixture passes through the cylinder 2 and flows out to the exhaust port 7. Therefore, an amount of fuel discharged to the exhaust port 7 can be readily controlled and temperature control of the three-way catalyst 31 and the NOx catalyst 32 can be readily performed. Furthermore, since fuel injected from the in-passage injection valve 81 is hardly retained in the cylinder 2, control of an in-cylinder air-fuel ratio can also be easily performed.

When the internal combustion engine 1 is operated at a leaner air-fuel ratio than the stoichiometric air-fuel ratio, since the temperature of the NOx catalyst 32 becomes lower than when operating the internal combustion engine 1 at the stoichiometric air-fuel ratio, a NOx amount that can be occluded by the NOx catalyst 32 is less likely to decrease. However, according to the present embodiment, since fuel injected into the intake port 3 is supplied to the three-way catalyst 31 and the fuel is oxidized at the three-way catalyst 31, the temperature of the three-way catalyst 31 can be raised. In addition, due to temperature rise of the three-way catalyst 31, the temperature of the NOx catalyst 32 on a downstream side of the three-way catalyst 31 can also be raised. Therefore, since a NOx amount that can be occluded at the NOx catalyst 32 can be increased, discharge of NOx into the atmosphere can be prevented.

Moreover, while temperature rise control is performed in order to raise the temperature of the NOx catalyst 32 in the present embodiment, temperature rise control can also be used for other purposes. For example, temperature rise control can be used when there is a need to raise the temperature of the exhaust gas purification apparatus for purposes such as generation of a filter or recovery from sulfur poisoning of an occlusion reduction-type NOx catalyst. In addition, temperature rise control can be used when raising the temperature of a selective reduction-type NOx catalyst to a target temperature within a purification window. For example, in a case of regeneration of the filter, in step S103, a determination may be made on whether or not the temperature of the filter has reached a temperature that enables oxidation of PM, and in step S105, a determination may be made on whether or not the temperature of the filter is lower than the temperature that enables oxidation of PM. Furthermore, for example, in a case of the selective reduction-type NOx catalyst, in step S103, a determination may be made on whether or not the temperature of the catalyst is a temperature within a range of a purification window, and in step S105, a determination may be made on whether or not the temperature of the catalyst is lower than a lower limit value of the purification window. Moreover, in a case of recovery from sulfur poisoning of the NOx catalyst 32, in step S103, a determination may be made on whether or not the temperature of the NOx catalyst 32 has reached a temperature necessary for recovery from sulfur poisoning, and in step S105, a determination may be made on whether or not the temperature of the NOx catalyst 32 is lower than the temperature necessary for recovery from sulfur poisoning.

EXPLANATION OF REFERENCE NUMERALS AND CHARACTERS 1 internal combustion engine
2 cylinder
3 intake port
4 intake pipe
5 intake valve
7 exhaust port
8 exhaust pipe
9 exhaust valve
13 crankshaft
15 piston 16 throttle
22 intake-side camshaft
23 intake-side VVT
25 exhaust-side camshaft
26 exhaust-side VVT
31 oxidation catalyst
32 occlusion reduction-type NOx catalyst
50 turbocharger
81 in-passage injection valve
82 in-cylinder injection valve
83 spark plug
90 ECU
91 accelerator depression amount sensor
92 crank position sensor
93 intake pressure sensor
94 exhaust pressure sensor
95 air flow meter

The invention claimed is:

1. A control apparatus of an internal combustion engine which is capable of a lean burn operation and which comprises:
   a catalyst which is provided in an exhaust passage of the internal combustion engine and which has an oxidizing ability;
   a supercharger;
   an in-passage injection valve which injects fuel into an intake passage of the internal combustion engine;
   an in-cylinder injection valve which injects fuel into a cylinder of the internal combustion engine; and
   a variable valve apparatus which changes at least one of an opening timing of an intake valve and a closing timing of an exhaust valve of the internal combustion engine, wherein
   the control apparatus performs creating a valve overlap that is a state where the intake valve and the exhaust valve of the internal combustion engine are opened, completing an injection of fuel from the in-passage injection valve during a period in which the intake valve is closed, and completing an injection of fuel from the in-cylinder injection valve during an intake stroke when intake air pressure of the internal combustion engine is higher than atmospheric pressure.

2. The control apparatus of an internal combustion engine according to claim 1, wherein the control apparatus equalizes air-fuel ratios during combustion inside the cylinder of the internal combustion engine between a case where all of the following is performed when intake air pressure of the internal combustion engine is higher than atmospheric pressure and a case where any one or more of the following is not performed: creating a valve overlap that is a state where the intake valve and the exhaust valve of the internal combustion engine are opened; completing the injection of fuel from the in-passage injection valve during a period in which the intake valve is closed; and completing the injection of fuel from the in-cylinder injection valve during an intake stroke.

3. The control apparatus of an internal combustion engine according to claim 1, wherein the control apparatus adjusts fuel injection amounts from the in-passage injection valve and the in-cylinder injection valve so that an overall air-fuel ratio that is a value obtained by dividing an intake air amount of the internal combustion engine by a combined fuel injection amount of the fuel injection amount of the in-passage injection valve and the fuel injection amount of the in-cylinder injection valve is a leaner air-fuel ratio than a stoichiometric air-fuel ratio.

4. The control apparatus of an internal combustion engine according to claim 1, wherein the control apparatus performs creating a valve overlap that is a state where the intake valve and the exhaust valve of the internal combustion engine are opened, completing the injection of fuel from the in-passage injection valve during a period in which the intake valve is closed, and completing the injection of fuel from the in-cylinder injection valve during an intake stroke when intake air pressure of the internal combustion engine is higher than atmospheric pressure and in a case where a temperature of the catalyst having oxidizing ability is equal to or higher than a prescribed temperature at which fuel reacts.

5. The control apparatus of an internal combustion engine according to claim 1, wherein the control apparatus performs creating a valve overlap that is a state where the intake valve and the exhaust valve of the internal combustion engine are opened, completing the injection of fuel from the in-passage injection valve during a period in which the intake valve is closed, and completing the injection of fuel from the in-cylinder injection valve during an intake stroke when intake air pressure of the internal combustion engine is higher than atmospheric pressure and in a case where a temperature of the catalyst having oxidizing ability is equal to or lower than a threshold.

6. The control apparatus of an internal combustion engine according to claim 1, wherein
   at least one of an occlusion reduction-type NOx catalyst, a selective reduction-type NOx catalyst, and a filter is provided in the exhaust passage on a downstream side of the catalyst having oxidizing ability, and
   the control apparatus, in a case where a temperature of at least one of the occlusion reduction-type NOx catalyst, the selective reduction-type NOx catalyst, and the filter is lower than a threshold, does not perform at least one of creating a valve overlap that is a state where the intake valve and the exhaust valve of the internal combustion engine are opened, completing the injection of fuel from the in-passage injection valve during a period in which the intake valve is closed, and completing the injection of fuel from the in-cylinder injection valve during an intake stroke when intake air pressure of the internal combustion engine is higher than atmospheric pressure.

7. The control apparatus of an internal combustion engine according to claim 1, wherein
   at least one of an occlusion reduction-type NOx catalyst, a selective reduction-type NOx catalyst, and a filter is provided in the exhaust passage on a downstream side of the catalyst having oxidizing ability, and
   the control apparatus, in a case where at least one of the following is not performed when a temperature of at least one of the occlusion reduction-type NOx catalyst, the selective reduction-type NOx catalyst, and the filter is equal to or higher than a target temperature, does not perform one of creating a valve overlap that is a state where the intake valve and the exhaust valve of the internal combustion engine are opened, completing the injection of fuel from the in-passage injection valve during a period in which the intake valve is closed, and completing the injection of fuel from the in-cylinder injection valve during an intake stroke when intake air pressure of the internal combustion engine is higher than atmospheric pressure.

8. The control apparatus of an internal combustion engine according to claim 1, wherein the control apparatus determines an amount of fuel injected from the in-passage injection valve based on a temperature of the catalyst having oxidizing ability and a low calorific value of the fuel.

9. The control apparatus of an internal combustion engine according to claim 1, wherein the control apparatus increases a valve overlap amount in a case where all of the following is performed when intake air pressure of the internal combustion engine is higher than atmospheric pressure as compared to a case where any one or more of the following is not performed: creating a valve overlap that is a state where the intake valve and the exhaust valve of the internal combustion engine are opened; completing the injection of fuel from the in-passage injection valve during a period in which the intake valve is closed; and completing the injection of fuel from the in-cylinder injection valve during an intake stroke.

10. The control apparatus of an internal combustion engine according to claim 1, wherein
in the internal combustion engine, the exhaust valve opens after the intake valve closes, the intake valve opens after the exhaust valve opens, the exhaust valve closes after the intake valve opens, the intake valve closes after the exhaust valve closes, and the control apparatus:
starts fuel injection from the in-passage injection valve after the intake valve closes and after the exhaust valve opens, or starts fuel injection from the in-passage injection valve after the intake valve closes and before the exhaust valve opens;
completes fuel injection from the in-passage injection valve after fuel injection from the in-passage injection valve is started and before the intake valve opens;
starts fuel injection from the in-cylinder injection valve after the intake valve opens and before the exhaust valve closes, or starts fuel injection from the in-cylinder injection valve after the intake valve opens and after the exhaust valve closes; and
completes fuel injection from the in-cylinder injection valve after fuel injection from the in-cylinder injection valve is started and before the intake valve closes.

* * * * *